G. H. PADGETT.
TRANSMISSION CASING.
APPLICATION FILED JULY 31, 1920.

1,366,677.

Patented Jan. 25, 1921.
2 SHEETS—SHEET 1.

INVENTOR
George H. Padgett,
BY William J. Jackson,
ATTORNEY

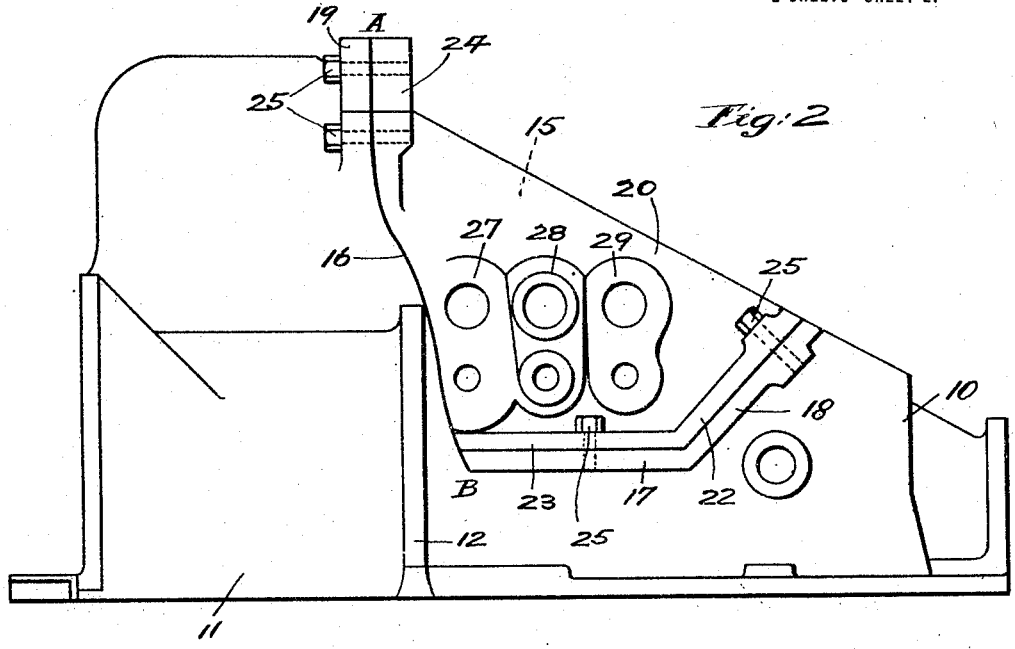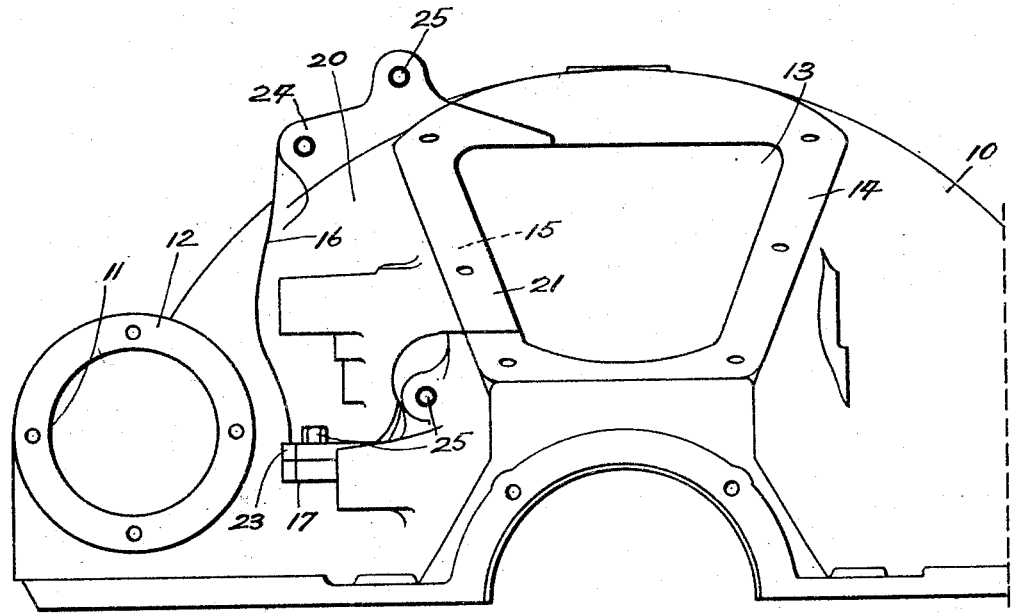

UNITED STATES PATENT OFFICE.

GEORGE H. PADGETT, OF PINE CASTLE, FLORIDA.

TRANSMISSION-CASING.

1,366,677.  Specification of Letters Patent.  Patented Jan. 25, 1921.

Application filed July 31, 1920. Serial No. 400,488.

*To all whom it may concern:*

Be it known that I, GEORGE H. PADGETT, a citizen of the United States, residing at Pine Castle, county of Orange, and State of Florida, have invented certain new and useful Improvements in Transmission-Casings, of which the following is a specification.

The invention has relation to transmission casings for Ford cars and has more especial relation to an improvement upon the construction of parts shown and described in my co-pending application serially numbered 305,028.

The transmission casing referred to in my said application is designed for use upon Ford cars which heretofore have not been equipped with self-starters. However, with the advent of a "new model" the transmission casings are now fashioned for the reception of a self-starting mechanism. According to the old type of motor vehicles both sides of the transmission casings are of the same configuration as clearly shown in my aforesaid patent application. According to the new type of motor vehicles, however, the transmission casing upon the driver's side of the vehicle is extended outwardly toward a side rail or beam of the vehicle chassis. The extended portion of the transmission casing is provided with flanged ends so that the removable cover-plate shown in my aforesaid patent application cannot be successfully employed.

The leading object of the present invention may be said to be the providing of a removable cover-plate capable of application to the transmission casing of a motor vehicle which casing is provided with a housing to accommodate self-starting mechanism. Other and further objects reside in the provision of general details of construction and arrangement and combination of parts as will hereinafter be more fully set forth.

The invention consists of the improvements hereinafter described and finally claimed.

The nature, characteristic features and scope of the invention will be more fully understood from the following description taken in connection with the accompanying drawings forming part hereof, and in which:

Fig. 2, is a view in side elevation thereof, and

Fig. 3, is an end view thereof.

Figure 1:
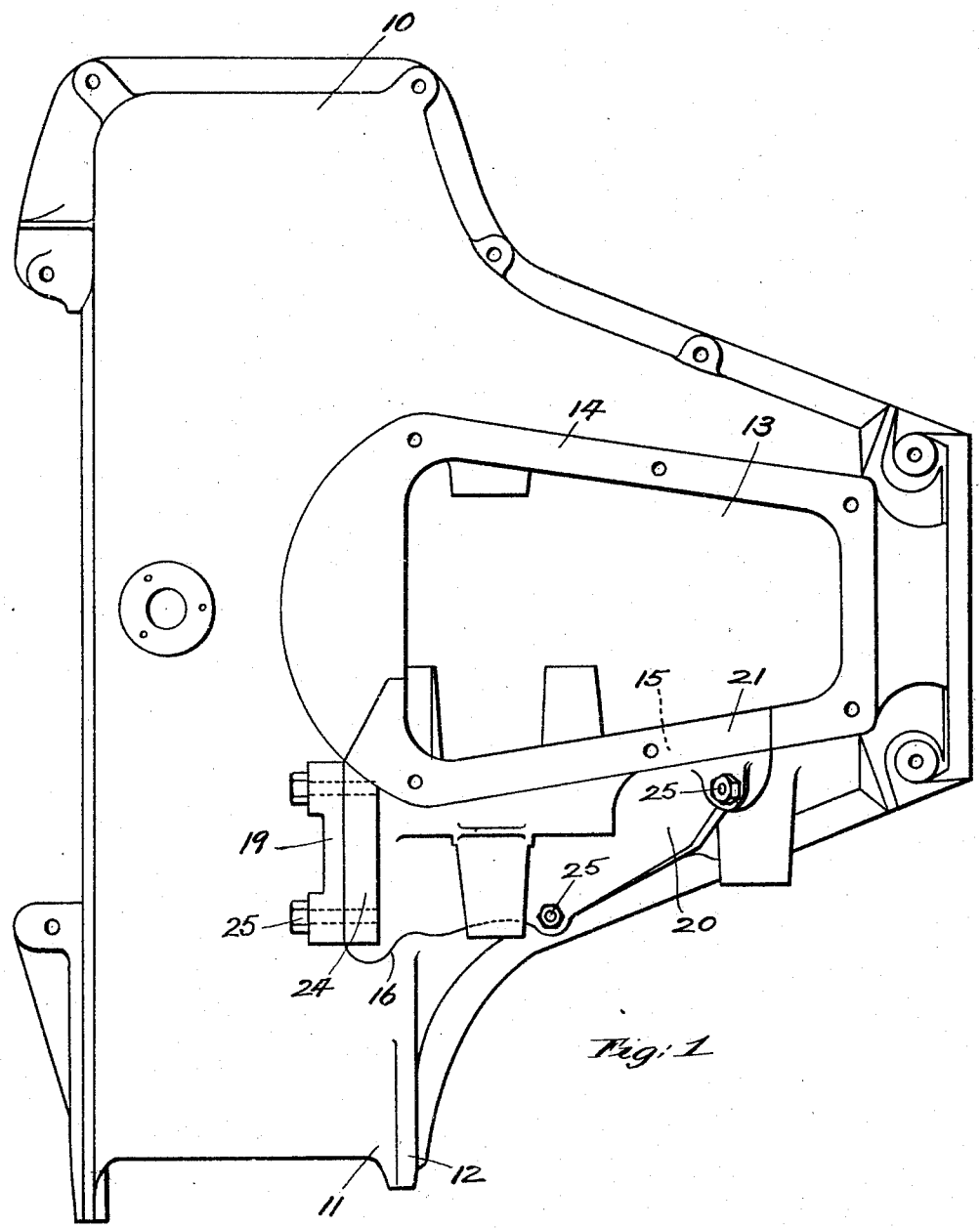
Figure 1, is a top or plan view of the upper section of a transmission casing embodying features of the invention.

For the purpose of illustrating my invention I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of the instrumentalities as herein shown and described.

In the drawings 10 designates the upper member of a Ford transmission casing of the new type or model which casing has extended therefrom, upon the driver's side of the vehicle, a housing 11 for containing self-starting mechanism. The member 10 is provided with the conventional top-opening 13 which is flanged as at 14. The member 10 upon the driver's side of the vehicle is provided with a side opening 15 in communication with the top-opening 13. That part of member 10 immediately adjacent and to one side of housing 11 is formed upon an irregular curved line as at 16. Member 10 adjacent the opening 13 is flanged as at 17 and 18, the flanged part 18 being at an angle to the horizontally flanged part 17. The member 10 is also provided with a flanged part 19 to one side of and extending slightly above member 10. The flanged parts 19, 17, 18 are provided with bolt-receiving openings for a purpose to presently be described. Fitted to the side opening 15 is a removable cover 20 having flanged portions 21, 22, 23, and 24. The flanged portion 21, when the cover is properly positioned, forms a continuation of flange 14; flanged parts 22 and 23 are seated upon flanged parts 18 and 17 and flanged part 24 abuts against part 19. The flanged parts 22, 23 and 24 are provided with bolt receiving openings in register with the bolt receiving openings of flanges 18, 17, and 19 to receive bolts 25 for clamping the cover 20 with respect to member 10. The flange 14 of member 10 and the flange 21 of cover 20 are each provided with bolt receiving openings whereby a conventional cover, not shown in the drawings, may be secured to place as usual. The cover 20 is provided with a forward rim which is formed upon an irregular curved line for coöperatively abutting against the part 16 of member 10 as clearly shown in Fig. 2. The purpose of forming these irregular curved portions is to provide clearance so that the cover rim may form a tight joint with the part 16. This is necessary because as clearly shown in Fig. 2, a part of cover 20 overhangs housing 11 forwardly considered, and a part thereof is located in a plane below the top of housing 11. In order to secure continuous co-operating edges from the part designated A to the part designated B it is required that these irregular curved portions be employed. It is of course understood that the meeting rims must form a tight joint in order to prevent leakage of oil. In practice the cover 20 is provided with apertured bosses 27, 28 and 29 for the reception of clutch, reverse and brake pedal shafts common to Ford constructions so that these parts are removable with the cover.

It will now be apparent that I have devised a novel and useful construction which embodies the features of advantage enumerated as desirable in the statement of the invention and the above description and while I have in the present instance shown and described the preferred embodiment thereof which has been found in practice to give satisfactory and reliable results, it is to be understood that the same is susceptible of modification in various particulars without departing from the spirit or scope of the invention or sacrificing any of its advantages.

What I claim is:

In a transmission case construction and the combination of an upper casing part having a conventional top-opening and having a flanged housing extended from one side thereof for containing self-starting mechanism, said casing part being provided with a side opening in communication with said top-opening that wall of the side opening adjacent said housing being formed upon an irregular curved line which extends from a point above to a point below and beyond the upper flanged part of said housing, a cover removably fitted to said side opening the forward end of which is formed to co-operatively engage with the irregular curved portion of said side opening and means for clamping said cover to said casing.

In testimony whereof, I have hereunto signed my name.

GEORGE H. PADGETT.